United States Patent [19]
Yoshida

[11] Patent Number: 5,836,844
[45] Date of Patent: Nov. 17, 1998

[54] REAR DERAILLEUR FOR A BICYCLE

[75] Inventor: Yoshiyuki Yoshida, Amagasaki, Japan

[73] Assignee: Shimano Inc., Osaka, Japan

[21] Appl. No.: 856,819

[22] Filed: May 15, 1997

[51] Int. Cl.$^6$ .............................. F16H 9/00; F16B 21/18
[52] U.S. Cl. .............................. 474/80; 411/353; 411/539
[58] Field of Search .................................. 474/78, 80, 82; 384/903; 411/539, 540, 541, 353, 352, 433

[56] References Cited

U.S. PATENT DOCUMENTS

| | | | |
|---|---|---|---|
| 2,894,425 | 7/1959 | Rapata | 411/352 X |
| 4,637,809 | 1/1987 | Nagano | 474/80 |
| 4,690,663 | 9/1987 | Nagano | 474/80 |
| 4,692,131 | 9/1987 | Nagano | 474/80 |
| 4,838,837 | 6/1989 | Testa | 474/80 |
| 5,498,211 | 3/1996 | Hsu | 474/80 |

OTHER PUBLICATIONS

*Shimano Europa;* Small Parts List for After Market; Shimano XTR Rear Derailleur (8–speed) RD–M950; one page; 1996.

*Standard Handbook of Fastening and Joining;* Editor—Robert O. Parmley, P.E.; 38 pp., including pp. 3–2–3–37; 1977.

*Primary Examiner*—Thomas R. Hannon
*Attorney, Agent, or Firm*—Shinjyu Global IP Counselors, LLP

[57] ABSTRACT

A rear derailleur for a bicycle is disclosed herein which basically includes a derailleur body which is coupled to the frame of a bicycle via a bracket axle assembly, and a chain guide assembly which is movably coupled to the derailleur body and engages the chain for moving the chain between the rear gears or sprockets. The bracket axle assembly includes a fixing bolt for pivotally securing the derailleur body to the frame of the bicycle. The bracket axle assembly also includes a torsion spring and a stop plate for controlling the rotational movement of the derailleur body relative to the frame and for normally biasing the derailleur body in a clockwise direction. A retaining assembly having a locking ring and a fixing member is utilized for maintaining the torsion spring and the stopper plate in the desired position on the shaft of the fixing bolt. The locking ring is preferably a two-piece construction and includes first and second substantially identical portions. Each of the portions of the locking ring has an inwardly extending flange which engages a retaining groove in the fixing bolt and a second axially extending flange which protects the shoulder of the fixing bolt. The fixing member has a center opening which frictionally retains the two portions of the locking ring within the groove of the fixing bolt.

34 Claims, 6 Drawing Sheets

REAR DERAILLEUR FOR A BICYCLE

FIELD OF THE INVENTION

The present invention generally relates to a rear derailleur for a bicycle. More specifically, the present invention relates to a bracket axle assembly of a rear derailleur for fixing the rear derailleur to the frame of the bicycle.

BACKGROUND OF THE INVENTION

Most of today's bicycles are multi-speed bicycles which allows the rider to select the appropriate gear ratio to suit the particular riding conditions encountered during the bicycle ride. One of the most popular types of gearing assemblies for multi-speed bicycles utilize a chain extending between a set of front sprockets mounted for rotation with the pedals and a set of rear sprockets mounted on the rear hub of the rear bicycle wheel for rotation therewith. A front derailleur is used to move the chain between the front sprockets or gears. Normally, the front derailleur is designed to hold the chain on the inner sprocket, i.e., the sprocket closest to the center of the bicycle. The rear derailleur, on the other hand, is normally arranged to position the chain on the outermost sprocket in its rest position. In other words, when the rider operates the shift operating device of the front derailleur shifting mechanism, the cable pulls the front derailleur such that the chain is moved from the innermost gear or sprocket outwardly to the next gear or sprocket. When the rider operates the shift operating device of the rear derailleur shifting mechanism, the cable pulls the rear derailleur such that it moves the chain from the outermost gear or sprocket to the next inner gear or sprocket. Of course, when the shift operating devices are moved to release (let out) the derailleur cables, the front derailleur will move inwardly towards the center of the bicycle, while the rear derailleur will move outwardly away from the center of the bicycle.

The rear derailleur for such multi-speed bicycles, are constantly being redesigned to operate more efficiently and to improve the design such that they can be made lighter. Accordingly, rear derailleurs are typically constructed of lightweight materials and are made as thin as possible. Of course, this can make the rear derailleur more fragile, and thus, more prone to being damaged should the bicycle hit the ground. One problem that sometimes occurs with certain rear derailleurs is that when the bicycle falls over, the fixing bolt that attaches the rear derailleur to the bicycle frame hits the ground causing the fixing bolt to be deformed. More specifically, in rear derailleurs of the prior art, the bracket axle assembly is maintained on the fixing bolt via a retaining ring which is received in a groove in the fixing bolt. When the bicycle tips over and the fixing bolt hits the ground, the retaining ring often damages the edge of the groove formed in the fixing bolt. This deformation of the fixing bolt occurs because the retaining ring typically only engages the groove at two or three points. Thus, the forces are concentrated at these points when the fixing bolt hits the ground. Accordingly, the fixing bolt and the various parts of the bracket axle assembly must be constructed of materials which resist such deformation. If such deformation occurs, it is often difficult to disassemble the bracket axle assembly from the derailleur body. Accordingly, the bracket axle assembly needs to be constructed to withstand the force of the fixing bolt of the bicycle hitting the ground.

In view of the above, it will be apparent to those skilled in the art from this disclosure that there exists a need for an improved bracket axle assembly which minimizes damage to the fixing bolt, and which is relatively lightweight and inexpensive to manufacture as well as easy to assemble. This invention addresses these needs in the art along with other needs which will become apparent to those skilled in the art once given this disclosure.

SUMMARY OF THE INVENTION

One object of the present invention is to provide an improved bracket axle assembly which retains the various parts of the bracket axle assembly on its fixing bolt, while minimizing damage to the fixing bolt in the event the bicycle tips over and the fixing bolt hits the ground.

Another object of the present invention is to provide a bracket axle assembly with a retaining member which is easy to assemble and disassemble on the fixing bolt.

Still another object of the present invention is to provide a rear derailleur which can be constructed of relatively lightweight materials.

The foregoing objects are basically attained by a bracket axle assembly for a rear derailleur, comprising a bolt having a shaft with a headed portion at a first end, a threaded portion at a second end and a groove formed adjacent the threaded portion; and a locking ring having a first radially extending flange engaging the groove of the bolt and a second flange extending axially from the first flange to overlie a part of the shaft of the bolt, the locking ring having an outer surface with an outer width such that the locking ring extends outwardly from the shaft of the bolt to form an abutment.

The foregoing objects are further attained by a bracket axle assembly for a rear derailleur, comprising a bolt having a shaft with a headed portion at a first end, a threaded portion at a second end and an annular groove formed adjacent the threaded portion; a locking ring having a first radially extending flange engaging the annular groove of the bolt, the locking ring having an outer surface with an outer width such that the locking ring extends outwardly from the shaft of the bolt to form an annular abutment; and a fixing member having a bore with an internal surface which is configured to engage the outer surface of the locking ring to frictionally retain the locking ring therein.

The foregoing objects can also be attained by a rear derailleur for a bicycle, comprising a derailleur body having a base member with a mounting bore extending therethrough and a movable member coupled to the base member; a chain guide assembly coupled to the movable member, the chain guide assembly having a guide sprocket and a tension sprocket; and a bracket axle assembly coupled to the base member to attach the derailleur body to a frame of the bicycle, the bracket axle assembly including a bolt having a shaft positioned in the mounting bore with a headed portion at a first end, a threaded portion at a second end and a groove formed adjacent the threaded portion, and a locking ring having a first radially extending flange engaging the groove of the bolt and a second flange extending axially from the first flange to overlie a part of the shaft of the bolt, the locking ring being sized to extend outwardly from the groove of the bolt to form an abutment.

Moreover, the foregoing objects can be attained by a rear derailleur for a bicycle, comprising a derailleur body having a base member with a mounting bore extending therethrough and a movable member coupled to the base member; a chain guide assembly coupled to the movable member, the chain guide assembly having a guide sprocket and a tension sprocket; and a bracket axle assembly coupled to the base member to attach the derailleur body to a frame of the bicycle, the bracket axle assembly including a bolt having a shaft positioned in the mounting bore with a headed portion at a first end, a threaded portion at a second end and a groove formed adjacent the threaded portion, a locking ring having a first radially extending flange engaging the groove of the bolt, the locking ring being sized to extend outwardly from the groove of the bolt to form an abutment, and a fixing member having a bore with an internal surface which is configured to frictionally retain the locking ring therein.

Other objects, advantages and salient features of the present invention will become apparent to those skilled in the art from the following detailed description, which, taken in conjunction with the annexed drawings discloses a preferred embodiment of the present invention.

BRIEF DESCRIPTION OF THE DRAWINGS

Referring now to the attached drawings which form part of this original disclosure.

DETAILED DESCRIPTION OF THE PREFERRED EMBODIMENT

Figure 1:
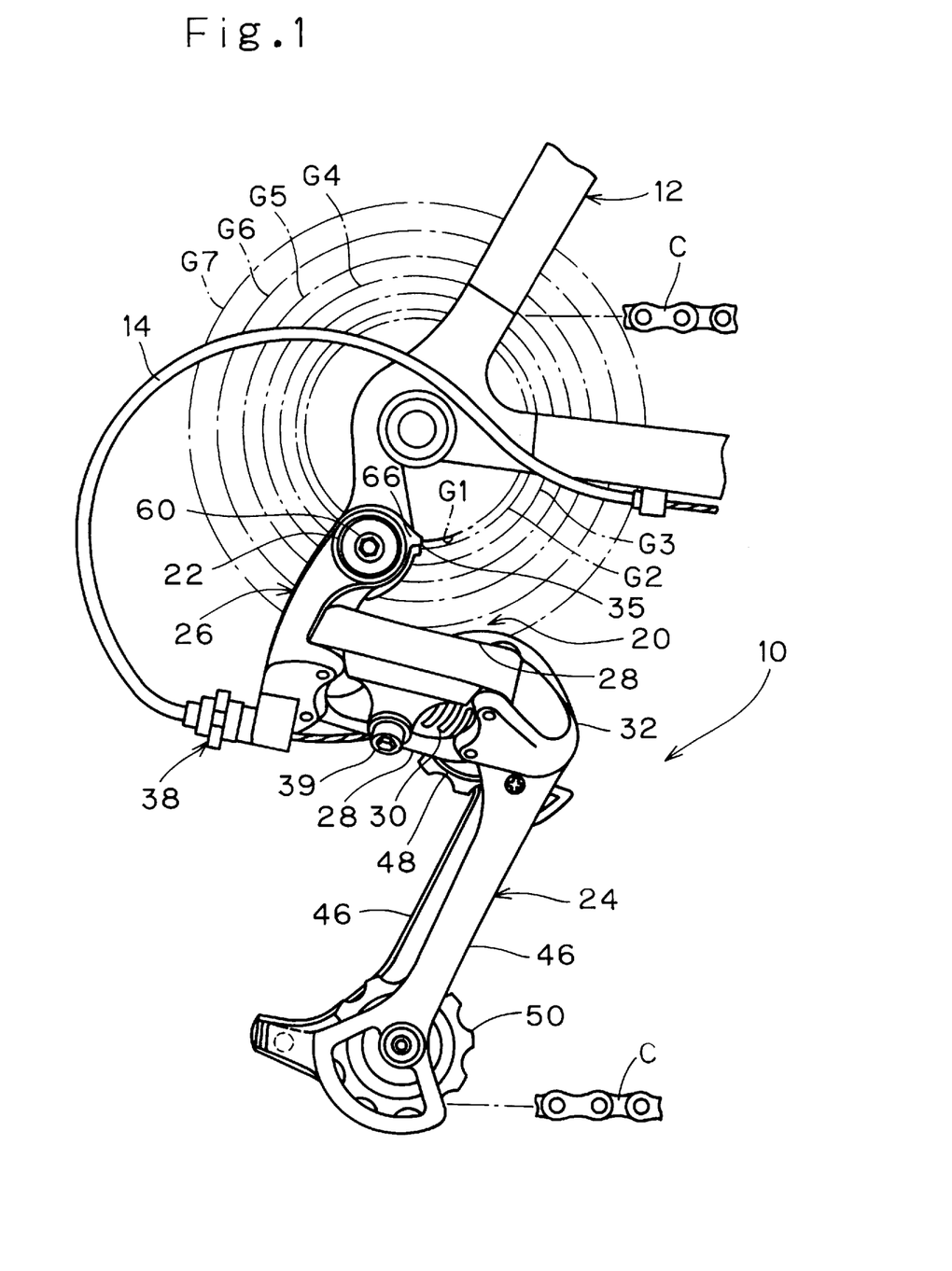
FIG. 1 is a front elevational view of a rear derailleur in accordance with the present invention, mounted on a rear fork end of a bicycle.
Figure 2:
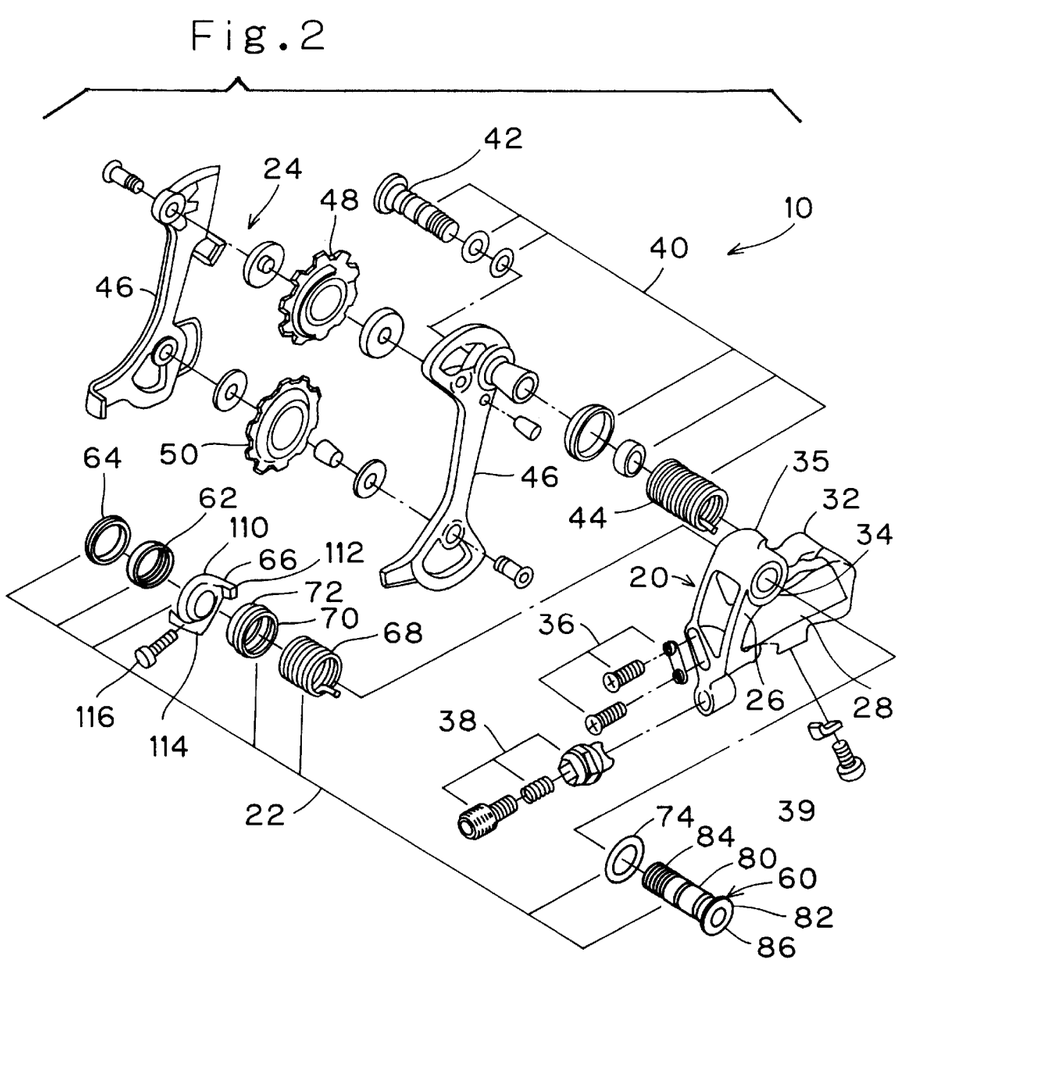
FIG. 2 is an exploded perspective view of the rear derailleur illustrated in FIG. 1.

Referring initially to FIGS. 1 and 2, a rear derailleur 10 in accordance with the present invention is illustrated as being coupled to frame 12 of a bicycle (only a portion illustrated in FIG. 1). More specifically, rear derailleur 10 is illustrated as being coupled to the rear fork end of frame 12 of a bicycle which has a rear gear assembly having seven rear gears G1–G7 with a chain C operatively coupling rear gears G1–G7 to a set of front gears or sprockets (not shown) in a conventional manner for transmitting the desired rotational torque to the rear wheel of the bicycle. Rear derailleur 10 is coupled to a rear derailleur shifting mechanism (not shown) via a rear derailleur cable 14 in a conventional manner. More specifically, derailleur 10 is designed to be normally biased outwardly such that the chain C is normally positioned on the outermost gear or sprocket G1. In other words, when the rider moves the shift operating mechanism, cable 14 pulls rear derailleur 10 to move chain C inwardly to engage the next gear. In other words, chain C is moved inwardly towards the center of the bicycle to enlarge the next larger gear or sprocket.

Rear derailleur 10 basically includes a rear derailleur body 20 coupled to frame 12 via a bracket axle assembly 22 and a chain guide assembly 24 movably coupled to derailleur body 20. As seen in FIGS. 1 and 2, the rear derailleur 10, which is used to illustrate the present invention herein, is basically a Shimano XTR rear derailleur (RD-M950) which has a modified bracket axle assembly 22 in accordance with the present invention. Accordingly, rear derailleur 10 will only be briefly discussed herein.

Derailleur body 20 has a pivot bracket or base member 26 coupled to frame 12 via bracket axle assembly 22, inner and outer linkage members 28 pivotally coupled at one end to base member 26, a coil tension spring 30 located between the linkage members 28, and a movable member 32 pivotally coupled to the ends of linkage members 28 which are opposite base member 26. Preferably, each of these components of derailleur body 20 are constructed of relatively lightweight, rigid materials which are known in the art.

Base member 26 is provided with a mounting bore 34 for receiving bracket axle assembly 22 therein for attaching rear derailleur 10 to frame 12 of the bicycle. While base member 26 is illustrated as being coupled directly to frame 12, it will be apparent to those skilled in the art from this disclosure that a removable derailleur hanger or hanging plate (not shown) may be utilized to connect base member 26 of rear derailleur 10 to frame 12. These types of derailleur hangers (not shown) are well-known in the art, and thus, will not be discussed or illustrated hereon. Base member 26 is rotatably coupled to frame 12 about the longitudinal axis of mounting bore 34. This rotational movement of base member 26 relative to frame 12 is limited by bracket axle assembly 22 which engages a protrusion or projection extending outwardly from base member 26 as discussed below.

Base member 26 is also provided with a conventional stroke adjusting assembly 36 and a cable adjusting bolt unit 38 as seen in FIG. 2. The stroke adjusting assembly 36 and the cable adjusting bolt unit 38 are conventional parts which are well-known in the prior art, and thus, will not be discussed or illustrated in detail herein. Rather, it will be apparent to those skilled in the art that these features are utilized in the rear derailleurs sold by Shimano, Inc.

The outer linkage member 28 is provided with a cable fixing bolt 39 for attaching the free end of the inner wire of shift cable 14 thereto. Accordingly, when the rider operates the shifting mechanism to pull the inner wire of shift cable 14, this will cause linkage members 28 to pivot inwardly against the bias of spring 30 to move movable member 32 and the chain guide assembly 24 attached thereto inwardly towards the center of the bicycle. This in turn will cause the chain C to move from an outer gear to the next inner gear. Of course, if the shift operating mechanism is moved to release the inner wire of shift cable 14, the spring 30 will move the linkage members 28 such that the chain guide assembly 24 will move the chain C outwardly from a larger gear to a smaller gear.

As best seen in FIGS. 1 and 2, movable member 32 has the chain guide assembly 24 pivotally attached thereto via a plate axle assembly 40. Basically, plate axle assembly 40 has a fixing bolt 42 and a torsion spring 44 for pivotally coupling chain guide assembly 24 to movable member 32 such that chain guide assembly 24 is biased in a clockwise direction as seen in FIG. 1. Since plate axle assembly 40 is relatively conventional in construction, it will not be discussed or illustrated in further detail herein.

Chain guide assembly 24 basically has a pair of guide plates 46 with a guide sprocket 48 rotatably coupled between guide plates 46 and a tension sprocket 50 rotatably coupled between guide plates 46. Guide sprocket 48 and tension sprocket 50 engage chain C in a conventional manner. Accordingly, the additional parts of chain guide assembly 24 will not be discussed or illustrated in detail herein.

Referring now to FIGS. 3–6, the bracket axle assembly 22 for coupling rear derailleur 10 to frame 12 is illustrated in further detail. In particular, bracket axle assembly 22 as illustrated herein includes a fixing bolt 60, a locking ring 62, a fixing member 64, a stop plate 66, a torsion spring 68, a support bushing 70 and inner and outer seals 72 and 74. Base member 26 is swingably supported on fixing bolt 60 for a limited amount of rotational movement as discussed below. Base member 26 is biased in a clockwise direction as viewed in FIG. 1 by torsion spring 68 such that projection 35 engages stop plate 66. The basic operation and movement of a rear derailleur is disclosed in U.S. Pat. No. 4,690,663 to Nagano, the disclosure of which is hereby incorporated herein by reference. However, bracket axle assembly 22 of the present invention is an improvement over the bracket axle assembly of the Nagano patent in that the Nagano patent utilizes a conventional snap ring while the present invention utilizes a locking ring 62 and fixing member 64 to protect fixing bolt 60 from being deformed in the event fixing bolt 60 hits the ground when the bicycle falls over.

Figure 5:
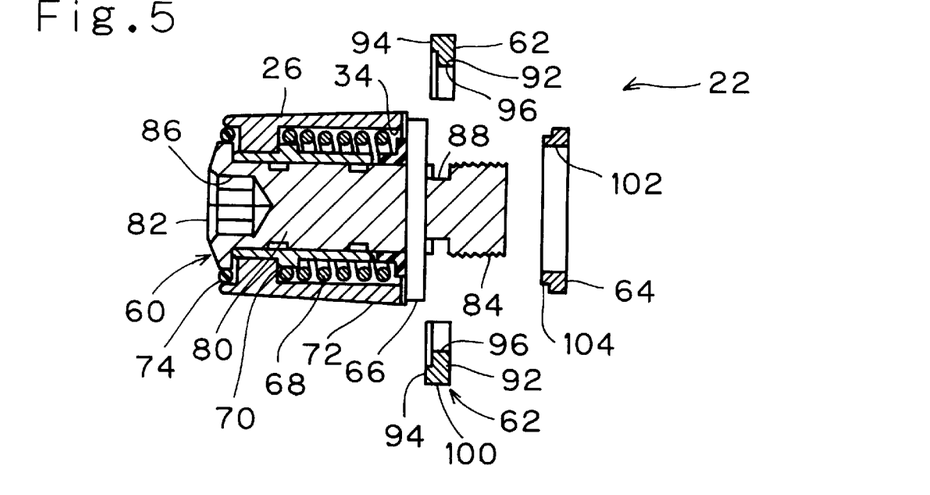
FIG. 5 is a partial cross-sectional view of the derailleur body and the bracket axle assembly of the rear derailleur illustrated in FIGS. 1–4, taken along a longitudinal axis of the fixing bolt and with the locking ring and fixing member exploded therefrom.
Figure 6:
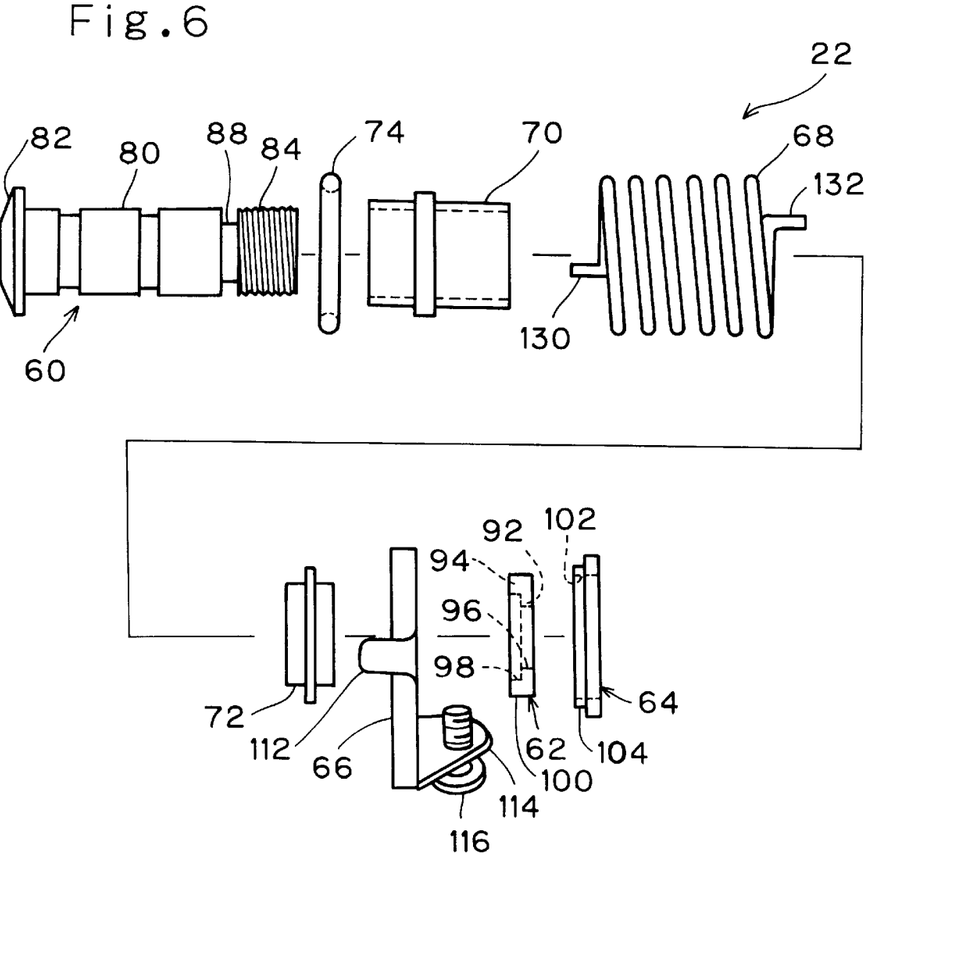
FIG. 6 is an exploded side elevational view of the bracket axle assembly for the rear derailleur illustrated in FIGS. 1–5.

As seen in FIGS. 5 and 6, fixing bolt 60 has a shaft 80 with a headed portion 82 located at one end and a threaded portion 84 located at the other end. The headed portion 82 is provided with a tool receiving recess 86 for turning fixing bolt 60 such that threaded portion 84 can be threaded into a hole formed in frame 12 of the bicycle. Preferably, fixing bolt 60 is constructed of a relatively strong, lightweight material such as aluminum or titanium.

A retaining groove 88 is formed in shaft 80 of fixing bolt 60 adjacent the threaded portion 84 of fixing bolt 60. Retaining groove 88 is preferably a continuous groove which extends 360° about shaft 80 of fixing bolt 60. Locking ring 62 is received within retaining groove 88 to form an annular abutment about shaft 80 of fixing bolt 60 to retain stop plate 66 and torsion spring 68 on shaft 80 of fixing bolt 60. This arrangement allows base member 26 to freely rotate about the longitudinal axis of shaft 80 of fixing bolt 60. However, this rotational movement of base member 26 is limited by stop plate 66 and torsion spring 68 as explained below.

Figure 7:
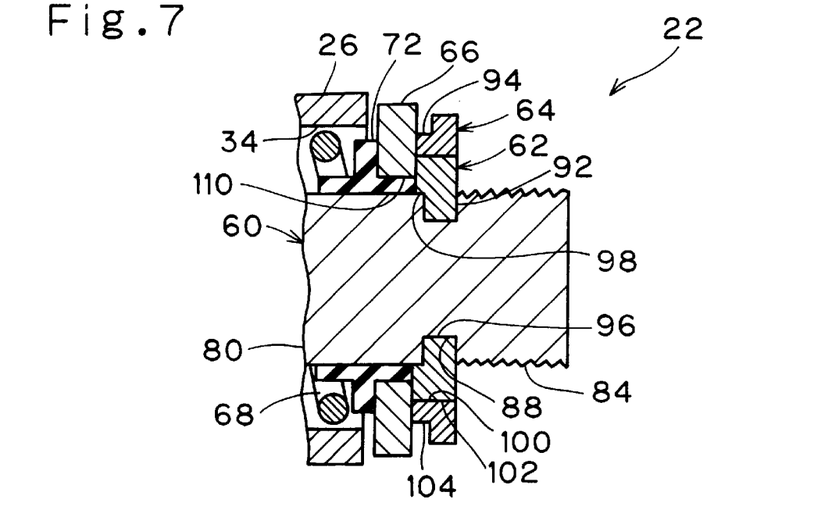
FIG. 7 is a partial, enlarged cross-sectional view of a portion of the base member or pivot bracket and the bracket axle assembly coupled thereto.
Figure 8:
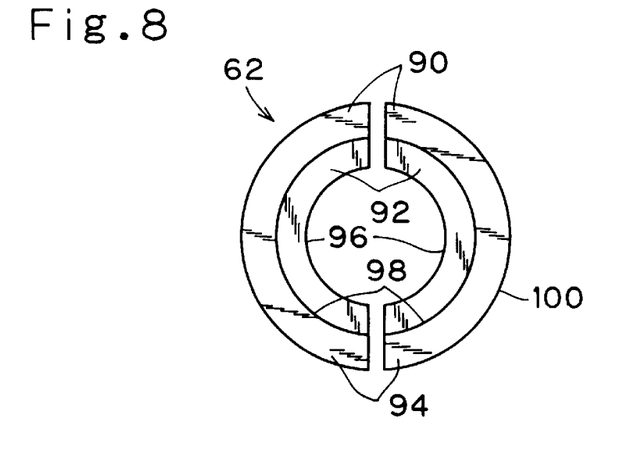
FIG. 8 is an enlarged front elevational view of the locking ring of the bracket axle assembly for the rear derailleur illustrated in FIGS. 1–7.
Figure 9:
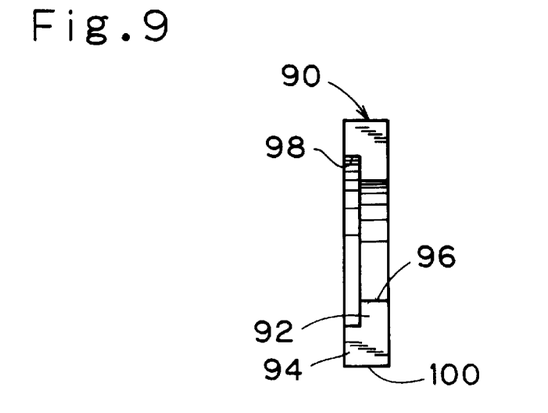
FIG. 9 is an enlarged side elevational view of one of the portions or halves of the locking ring illustrated in FIG. 8.
Figure 10:
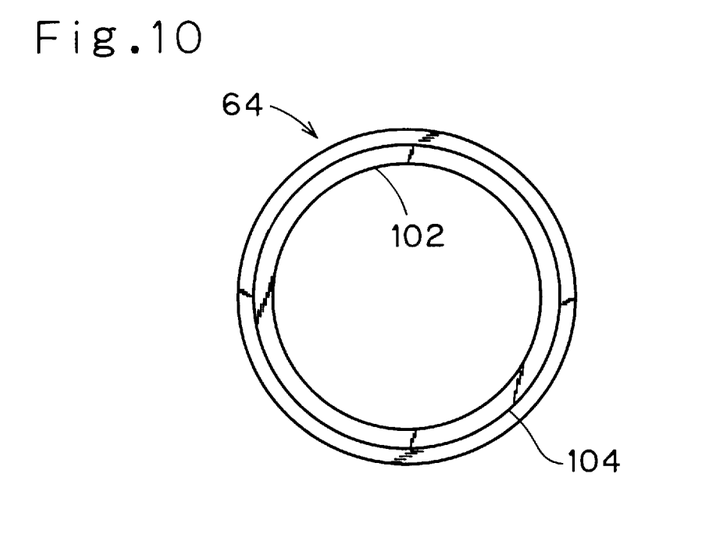
FIG. 10 is an enlarged front elevational view of the fixing ring of the bracket axle assembly for the rear derailleur illustrated in FIGS. 1–7.
Figure 11:
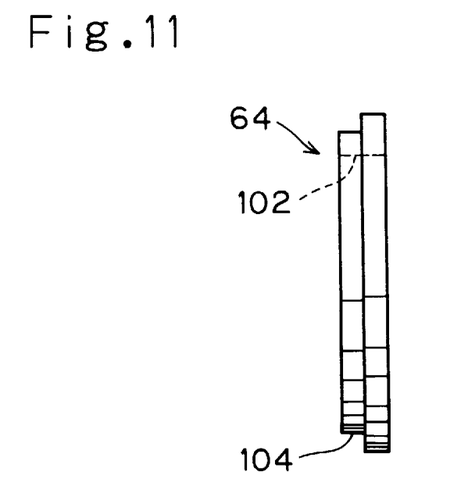
FIG. 11 is an enlarged side elevational view of the fixing ring illustrated in FIG. 10.

As seen in FIGS. 8 and 9, locking ring 62 is preferably constructed of a rigid metallic material such as aluminum or titanium. Locking ring 62 is preferably a two-piece element having first and second substantially identical portions 90. Each of the portions 90 is substantially semi-circular and extends approximately 180° between its free ends. Each of the portions 90 has a first radially extending retaining flange 92 and a second axially extending flange 94. Retaining flange 92 has a curved inner surface 96 which faces radially inwardly and extends approximately 180°. The curved inner surface 96 of retaining flange 92 is preferably shaped to mate with retaining groove 88 of fixing bolt 60 as seen in FIG. 7. In other words, the radius of curved inner surface 96 is substantially identical or slightly greater than the radius of shaft 80 within groove 88. Flange 94 is preferably a curved flange which extends axially from retaining flange 92 at its outer end. The inner surface 98 of flange 94 extends approximately 180° and has a radius which is substantially equal to or slightly greater than the radius of shaft 80 adjacent retaining groove 88. The outer surface 100 of flange 94 is preferably curved and extends approximately 180°.

Accordingly, when the two portions 90 of locking ring 62 are positioned around shaft 80 of fixing bolt 60, retaining flanges 92 extend inwardly into retaining groove 88, while flanges 94 encircle the shoulder of shaft 80 of fixing bolt 60 which is formed at retaining groove 88 as seen in FIG. 7. In this way, locking ring 62 has a first retaining flange which extends approximately 180° to substantially continuously engage groove 88 of fixing bolt 60. Moreover, locking ring 62 has a second substantially continuous axially extending flange which overlies a portion of the outer surface of shaft 80 of fixing bolt 60 to prevent the shoulder formed by groove 88 of fixing bolt 60 from being deformed. Of course, it will be apparent to those skilled in the art that the first and second flanges of locking ring 62 which are formed by flanges 92 and flanges 94 can have other types of configurations depending upon the configurations of shaft 80 of fixing bolt 60 and retaining groove 88 formed in shaft 80 of fixing bolt 60.

Fixing member 64 is preferably a one-piece, unitary member constructed out of a hard rigid material such as aluminum or titanium. Preferably, fixing member 64 is also constructed of a lightweight material to minimize the weight of rear derailleur 10. Fixing member 64 is preferably ring-shaped and has an inner surface 102 forming an opening for receiving and engaging the outer surface 100 of locking ring 62. More specifically, the inner surface 102 of fixing member 64 is configured to frictionally engage the outer surface 100 of locking ring 62 to frictionally retain locking ring within fixing member 64. Accordingly, after the first and second portions 90 of locking ring 62 are installed within retaining groove 88 of fixing bolt 60, as discussed above, fixing member 64 can be inserted over the threaded portion 84 of fixing bolt 60 and then inserted over locking ring 62 to secure locking ring 62 within retaining groove 88 to form an annular abutment.

Preferably, the outer surface of fixing member 64 is stepped-shaped to form a recessed portion 104. In other words, the outer surface of fixing member 64 has a first portion with a first diameter and a second portion or recessed portion with a smaller diameter than the first portion. The recessed portion should face stop plate 66 such that a tool (screwdriver or the like) can be inserted into the recessed portion 104 of fixing member 64 such that fixing member 64 can be pried away from stop plate 66 to release locking ring 62. Of course, it will be apparent to those skilled in the art from this disclosure that recessed portion 104 could be a single notch or a plurality or notches formed in the outer surface of fixing member 64 as needed and/or desired.

In any event, when portions 90 are coupled about shaft 80 such that retaining flanges 92 are received in retaining groove 88, flanges 94 form a continuous abutment shoulder for engaging stop plate 66. In other words, the outer diameter or width of locking ring 62 is such that it prevents stop plate 66 from sliding over locking ring 62.

Figure 3:
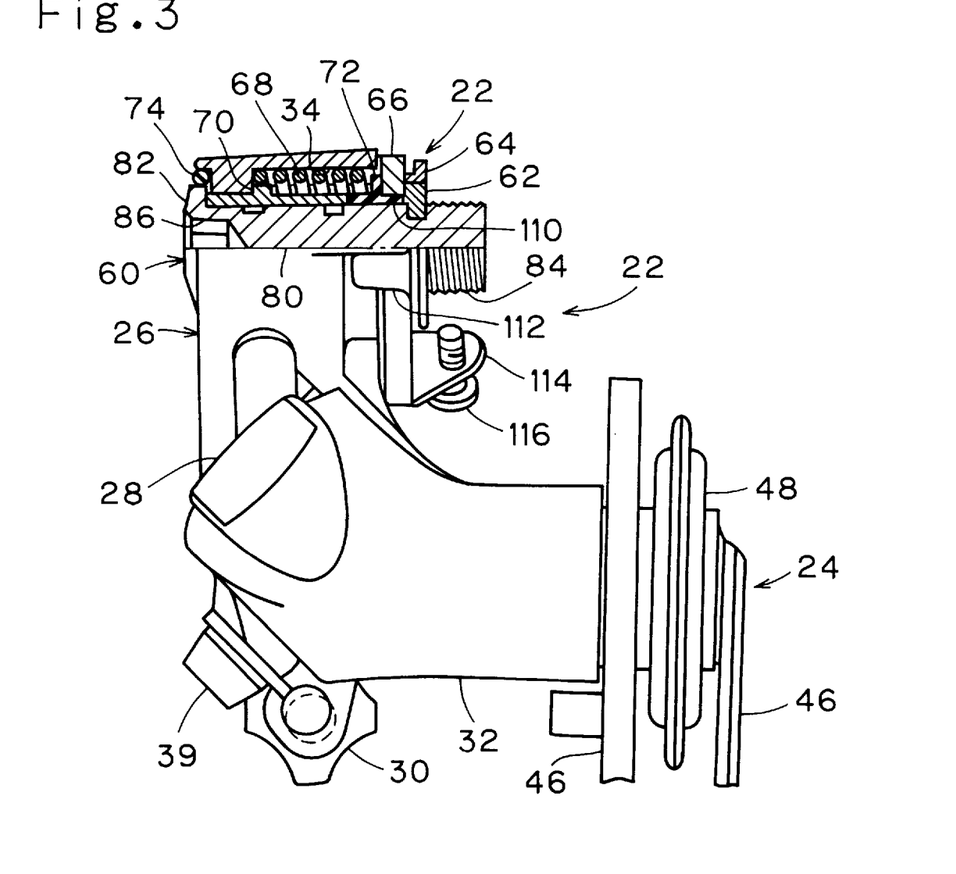
FIG. 3 is an enlarged, partial side elevational view of the rear derailleur illustrated in FIG. 1 and 2 with a portion of the base member or pivot bracket broken away for purposes of illustration of the bracket axle assembly.
Figure 4:
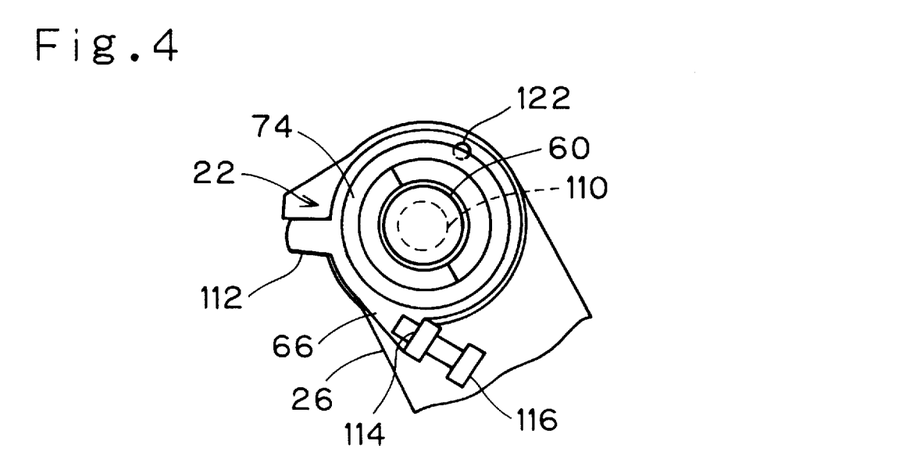
FIG. 4 is an enlarged, partial elevational view of the rear derailleur illustrated in FIGS. 1–3 as viewed along the longitudinal pivot axis of the fixing bolt for the bracket axle assembly.

Referring to FIGS. 2–6, preferably, stop plate 66 is formed of a metal plate of about 2.6 mm in thickness. Stop plate 66 has a center hole 110 for receiving shaft 80 of fixing bolt 60 therethrough such that stop plate 66 can rotate around shaft 80 of fixing bolt 60. However, the amount of rotation is limited by a protrusion or projection 112 which extends axially from stop plate 66 to engage the protrusion or projection 35 formed on base member 26. As seen in FIGS. 3 and 4, stop plate 66 also has an axially extending flange 114 with a screw 116 threadedly coupled in a threaded hole 118 in flange 114 for engaging an outwardly extending stop formed on frame 12. As seen in FIG. 4, a hole 122 is formed in the body of stop plate 66 for engaging torsion spring 68 as discussed below.

Torsion spring 68 is preferably a conventional coil spring having a first end 130 to be secured within bore 34 of base member 26, and a second free end 132 which is received in hole 122 of stop plate 66. Torsion spring 68 is sized to be positioned about shaft 80 of fixing bolt 60 such that first free end 130 engages base member 26 of derailleur body 20 and second end 132 engages hole 122 of stop plate 66 to bias the projection or protrusion 112 of stop plate 66 against protrusion or projection 35 of base member 26. The axial movement of torsion spring 68 as well as stop plate 66 is blocked by locking ring 62 and fixing member 64 as mentioned above. Hence, even when the shaft 80 is screwed into the frame 12, the rotation of stop plate 66 is compensated.

Support bushing 70 is fixedly retained within mounting bore 34 of base member 26 such that support bushing 70 and base member 26 are an integral unit for rotatably supporting derailleur 10 about fixing bolt 60. In particular, shaft 80 of fixing bolt 60 is rotatably received within support bushing 70 so that base member 26 and spring 68 freely rotate about shaft 80 of fixing bolt 60. Support bushing 70 should be constructed of a relatively hard, rigid material such that support bushing 70 is fixedly secured within mounting bore 34 of base member 26. If support bushing 70 is too soft or not integrally fixed within mounting bore 34 of base member 26, then derailleur 10 may swing too easily.

Inner and outer seals 72 and 74 are ring-type seals constructed of a conventional sealing type material. Seals 72 and 74 prevent dirt and the like from entering the mounting bore 34 of base member 26. Seals 72 and 74 can be constructed of any suitable material. For example, seals 72 and 74 can be constructed of an elastomeric material or other synthetic resins which are known in the bicycle art. Moreover, shaft 80 of fixing bolt 60 can have additional seals as needed and/or desired.

While only one embodiment has been chosen to illustrate the present invention, it will be understood by those skilled in the art from this disclosure that various changes and modifications can be made herein without departing from the scope of the present invention as defined in the appended claims.

What is claimed is:

1. A bracket axle assembly for a rear derailleur, comprising:
   a bolt having a shaft with a headed portion at a first end, a threaded portion at a second end and a groove formed adjacent said threaded portion; and
   a locking ring having a first radially extending flange engaging said groove of said bolt and a second flange extending axially from said first flange to overlie a part of said shaft of said bolt, said locking ring having an outer surface with an outer width such that said locking ring extends outwardly from said shaft of said bolt to form an abutment.

2. A bracket axle assembly according to claim 1, further comprising:
   a fixing member having a bore with an internal surface which is configured to engage said outer surface of said locking ring to frictionally retain said locking ring therein.

3. A bracket axle assembly according to claim 2, wherein said locking ring includes at least a first portion with first and second free ends and a second portion with first and second free ends, said first and second portions being separable from each other.

4. A bracket axle assembly according to claim 3, wherein said groove of said bolt is a substantially continuous annular groove.

5. A bracket axle assembly according to claim 4, wherein said first flange has an inner radially facing surface which extends approximately 360°.

6. A bracket axle assembly according to claim 5, wherein said inner surface of said first flange is substantially circular.

7. A bracket axle assembly according to claim 6, wherein said inner surface of said first flange extends approximately 180° along said first portion and extends approximately 180° along said second portion.

8. A bracket axle assembly according to claim 2, wherein said fixing member has an outer surface with a recessed section.

9. A bracket axle assembly according to claim 8, wherein said recessed section extends around said outer surface of fixing member.

10. A bracket axle assembly according to claim 9, wherein said outer surface of said fixing member along said recessed section is substantially circular.

11. A bracket axle assembly for a rear derailleur, comprising:
    a bolt having a shaft with a headed portion at a first end, a threaded portion at a second end and an annular groove formed adjacent said threaded portion;
    a locking ring having a first radially extending flange engaging said annular groove of said bolt, said locking ring having an outer surface with an outer width such that said locking ring extends outwardly from said shaft of said bolt to form an annular abutment; and
    a fixing member having a bore with an internal surface which is configured to engage said outer surface of said locking ring to frictionally retain said locking ring therein.

12. A bracket axle assembly according to claim 11, wherein said locking ring includes at least a first portion with first and second free ends and a second portion with first and second free ends, said first and second portions being separable from each other.

13. A bracket axle assembly according to claim 12, wherein said first flange has an inner radially facing surface which extends approximately 360°.

14. A bracket axle assembly according to claim 13, wherein said locking ring has a second flange extending axially from said first flange to overlie a part of said shaft of said bolt.

15. A bracket axle assembly according to claim 12, wherein said first portion is substantially identical to said second portion.

16. A bracket axle assembly according to claim 11, wherein said fixing member has an outer surface with a recessed section.

17. A bracket axle assembly according to claim 16, wherein said recessed section extends around said outer surface of fixing member.

18. A bracket axle assembly according to claim 17, wherein said outer surface of said fixing member along said recessed section is substantially circular.

19. A rear derailleur for a bicycle, comprising:

a derailleur body having a base member with a mounting bore extending therethrough and a movable member coupled to said base member;

a chain guide assembly coupled to said movable member, said chain guide assembly having a guide sprocket and a tension sprocket; and a bracket axle assembly coupled to said base member to attach said derailleur body to a frame of the bicycle, said bracket axle assembly including a bolt having a shaft positioned in said mounting bore with a headed portion at a first end, a threaded portion at a second end and a groove formed adjacent said threaded portion, and a locking ring having a first radially extending flange engaging said groove of said bolt and a second flange extending axially from said first flange to overlie a part of said shaft of said bolt, said locking ring being sized to extend outwardly from said groove of said bolt to form an abutment.

20. A rear derailleur according to claim 19, further comprising:

a fixing member having a bore with an internal surface which is configured to frictionally retain said locking ring therein.

21. A rear derailleur according to claim 20, wherein said locking ring includes a first portion with first and second free ends and a second portion with first and second free ends, said first and second portions being separable from each other.

22. A rear derailleur according to claim 21, further comprising:

a stop plate mounted on said shaft of said bolt with a first projection for engaging the frame of the bicycle and a second projection engaging said derailleur body; and a torsion spring positioned about said shaft of said bolt with a first end engaging said derailleur body and a second end engaging said stop plate to bias said second projection against said derailleur body.

23. A rear derailleur according to claim 22, wherein said first flange has an inner radially facing surface which extends approximately 360°.

24. A rear derailleur according to claim 23, wherein said inner surface of said first flange is substantially circular.

25. A rear derailleur according to claim 24, wherein said inner surface of said first flange extends approximately 180° along said first portion and extends approximately 180° along said second portion.

26. A rear derailleur according to claim 20, wherein said fixing member has an outer surface with a recessed section.

27. A rear derailleur according to claim 26, wherein said recessed section extends around said outer surface of fixing member.

28. A rear derailleur according to claim 27, wherein said outer surface of said fixing member along said recessed section is substantially circular.

29. A rear derailleur for a bicycle, comprising:

a derailleur body having a base member with a mounting bore extending therethrough and a movable member coupled to said base member;

a chain guide assembly coupled to said movable member, said chain guide assembly having a guide sprocket and a tension sprocket; and a bracket axle assembly coupled to said base member to attach said derailleur body to a frame of the bicycle, said bracket axle assembly including a bolt having a shaft positioned in said mounting bore with a headed portion at a first end, a threaded portion at a second end and a groove formed adjacent said threaded portion, a locking ring having a first radially extending flange engaging said groove of said bolt, said locking ring being sized to extend outwardly from said groove of said bolt to form an abutment, and a fixing member having a bore with an internal surface which is configured to frictionally retain said locking ring therein.

30. A rear derailleur according to claim 29, wherein said locking ring includes a first portion with first and second free ends and a second portion with first and second free ends, said first and second portions being separable from each other.

31. A rear derailleur according to claim 30, wherein said first portion is substantially identical to said second portion.

32. A rear derailleur according to claim 29, further comprising:

a stop plate mounted on said shaft of said bolt with a first projection for engaging the frame of the bicycle and a second projection engaging said derailleur body; and a torsion spring positioned about said shaft of said bolt with a first end engaging said derailleur body and a second end engaging said stop plate to bias said second projection against said derailleur body.

33. A rear derailleur according to claim 29, wherein said first flange has an inner radially facing surface which extends approximately 360°.

34. A rear derailleur according to claim 29, wherein said fixing member has an outer surface with a recessed section.

* * * * *